July 10, 1945.  R. R. CURTIS ET AL  2,380,222
PUMP SEAL AND DRIVE CONSTRUCTION
Filed Feb. 15, 1943
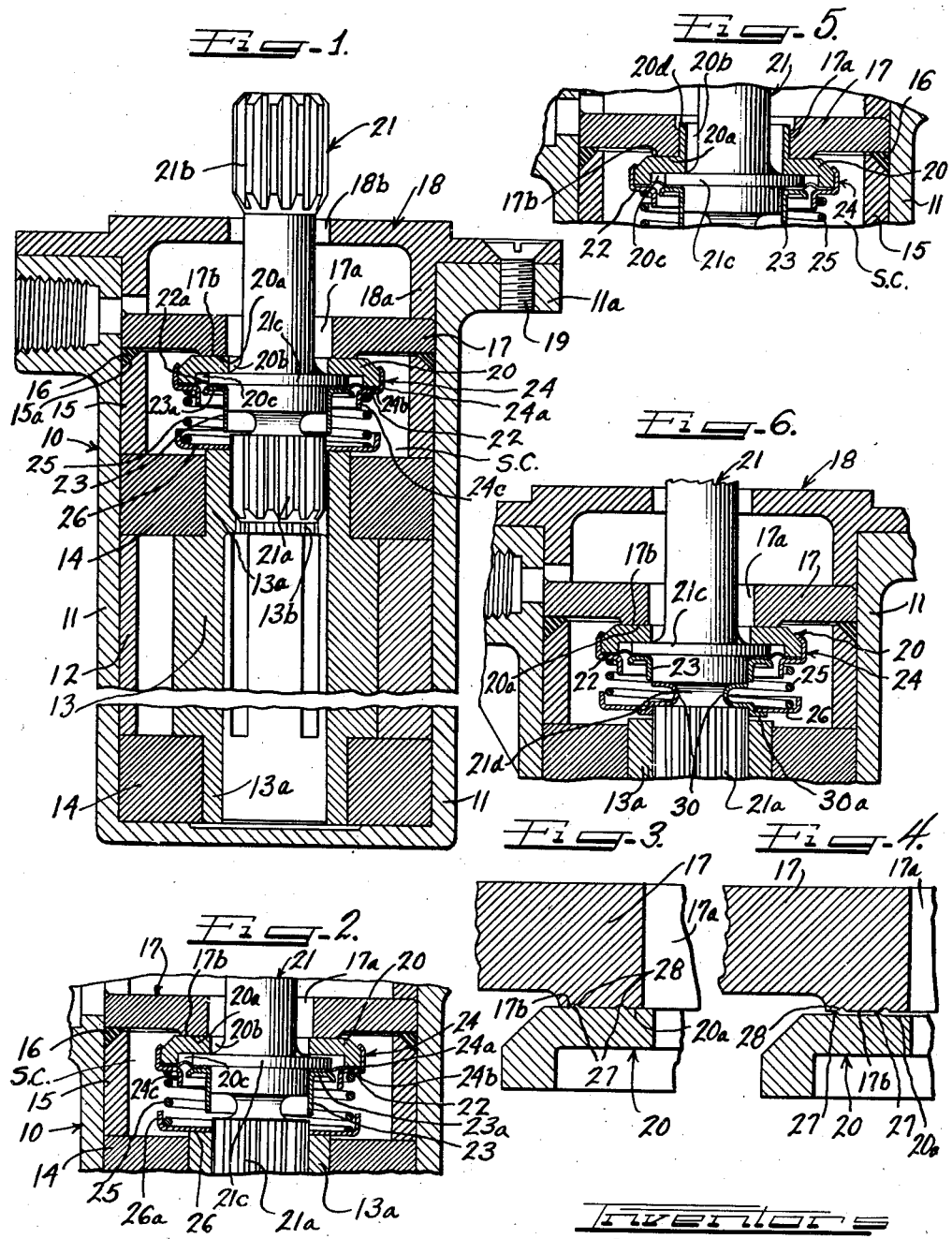
Inventors
RUSSELL R. CURTIS.
RICHARD L. GATES.
by Charles W. Stills Attys.

Patented July 10, 1945

2,380,222

UNITED STATES PATENT OFFICE 2,380,222

PUMP SEAL AND DRIVE CONSTRUCTION

Russell R. Curtis and Richard L. Gates, Dayton, Ohio, assignors to Curtis Pump Company, Dayton, Ohio, a corporation of Ohio Application February 15, 1943, Serial No. 475,930

3 Claims. (Cl. 286—11)

This invention relates to seal constructions for relatively rotating members whereby the members may be displaced without affecting the efficiency of the seal.

Specifically the invention relates to shaft seals of the relatively rotating seal ring type especially useful in pump constructions and characterized by maintenance of the same sealing contact between the rings irrespective of axial or transverse displacement of the shaft.

The invention also includes within its scope a drive construction for pumps which cooperates with the seal construction.

While the invention will be hereinafter specifically described as embodied in rotary vane type pumps, it should be understood that the seals and drive of this invention are useful in many mechanical devices and the invention is not limited to pump installations.

According to this invention, a stationary seal ring receives a rotating seal ring in sliding face engagement therewith. A shaft projects freely through both rings and has a collar seated in a recess of the rotating ring. A flexible diaphragm such as a disk of flexible synthetic plastic material, rubber, synthetic rubber, leather, and the like overlies the recessed face of the rotating seal ring and the shaft flange. A sleeve is pressed on the shaft to clamp the inner marginal portion of the diaphragm tightly against the shaft flange to prevent leakage therebetween. A cup-shaped spring retainer surrounds the rotating seal ring and clamps the outer marginal portion of the diaphragm against the sealing ring to prevent leakage therebetween. A spring acts on the retainer to urge the rotating seal ring against the stationary seal ring.

With this construction the shaft can be cocked or moved axially relative to the seal ring without in any way affecting the sliding face engagement between the rings since the diaphragm will flex to permit such shaft displacement without displacing the rotating ring.

The shaft itself can be splined into the rotor of a vane-type pump by means of cooperating involute splined teeth on the shaft and pump rotor. The internal pump pressure will act on the splined end of the shaft to force the same away from the rotor thereby urging the collar against the rotating seal ring.

It is, then, an object of the invention to provide a seal construction for relatively rotating parts which is not decreased in efficiency in the event of displacement of the parts.

A further object of the invention is to provide a seal construction of the relatively rotating seal ring type which maintains the same sliding face engagement of the ring even when parts carrying the ring are relatively displaced.

A specific object of the invention is to provide a pump seal including a stationary seal ring, a rotating seal ring driven by the pump shaft, and a flexible diaphragm connecting the shaft and rotating seal ring to permit displacement of the shaft without displacing the ring.

A still further object of the invention is to provide a pump, seal and drive construction wherein pump pressure is effective to urge the pump drive shaft into engagement with a seal ring driven thereby and wherein the pump shaft can be displaced relative to said seal ring without breaking the seal.

Another important object of the invention is to provide a seal construction of the type having relatively rotating rings in sliding face engagement wherein said engagement is maintained by spring pressure applied outwardly of the engaging areas of the seal rings.

Other and further objects of the invention will be apparent to those skilled in the art from the following detailed description of the annexed sheet of drawings which, by way of preferred examples only, illustrates three embodiments of the invention as applied to rotary vane type pumps.

On the drawing:

Figure 1 is a broken vertical cross-sectional view, with parts in elevation, of a rotary vane pump equipped with a seal and drive construction according to this invention.

Figure 2 is a fragmentary cross-sectional view of the seal and drive construction shown in Figure 1, illustrating the manner in which the pump shaft can be displaced without displacing the seal.

Figure 3 is a greatly enlarged fragmentary cross-sectional view illustrating commonly formed ridges and grooves on the seal rings and the manner in which the ridges are always maintained seated in the grooves which they form in accordance with this invention.

Figure 4 is a view similar to Figure 3 illustrating the manner in which the ridges can separate the seal rings in the event that they are ever displaced from their grooves, thereby breaking sealing contact between the rings.

Figure 5 is a fragmentary vertical cross-sectional view, with parts in elevation, illustrating a modified seal construction wherein the rotating seal ring has a pilot portion seated in the stationary seal ring.

Figure 6 is a fragmentary cross-sectional view, with parts in elevation, illustrating a different form of spring arrangement for the seal of Figure 1.

As shown on the drawing:

In Figure 1 the reference numeral 10 designates generally a pump including a casing 11 having pumping means mounted therein including a liner 12 defining, with its inner surface, the pump bore, a rotor 13 slidably carrying vanes for acting on the pump bore, and bearing rings 14 for reduced diameter hub portions 13a of the rotor. One bearing ring 14 is bottomed on the end wall of the casing 11 and the other bearing ring 14 is bottomed on the liner 12. One hub portion 13a extends through and beyond the bearing ring 14 which is bottomed on the liner 12 and is internally splined as at 13b.

A spacer sleeve 15 is mounted in the casing 11 and abuts the outer face of the bearing ring 14 bottomed on the liner 12. The other end of the sleeve 15 is beveled as at 15a to provide a recess for a resilient sealing ring or gasket 16.

A stationary seal ring 17 is mounted in the casing 11 and is urged against the gasket ring 16 by the skirt 18a of an end cap 18 for the casing. This end cap is held on an outturned flange 11a of the casing by means of screws such as 19. The stationary seal ring 17 is thus held between the skirt 18a of the cover and the gasket 16 while the spacer sleeve 15 cooperates to hold the gasket in spaced relation from the bearing ring 14 and thus provides a seal chamber S. C. in the casing.

The cover 18 is centrally apertured as at 18b and the stationary seal ring 17 is centrally apertured as at 17a.

The stationary seal ring 17 has a raised face portion 17b projecting into the seal chamber S. C. and surrounding the aperture 17a for receiving thereagainst the flat face 20a of a rotating seal ring 20.

The rotating seal ring 20 is centrally apertured as at 20b and has a recessed face opposite the face 20a thereof providing a recess 20c.

A driver or pump shaft 21 extends through the apertures 18b, 17a, and 20b and thence through the seal chamber S. C. to terminate in a splined end portion 21a adapted to slidably seat in the splined hub 13a of the pump rotor. The splined teeth on the hub and on the shaft are arranged in involute form so that the shaft can be displaced in a transverse direction as well as move in an axial direction without disconnecting the drive connection to the rotor.

The shaft 21 has a second splined end 21b outside of the pump adapted for connection with an engine drive shaft or other prime mover.

The shaft 21 has a collar portion or flange 21c seated in the recess 20c of the rotating seal ring 20. This collar 21c is of smaller diameter than the recess 20c so as to provide a gap or annular space around the collar. The flange is bottomed on the bottom of the recess 20c.

A flexible diaphragm 22 composed of sheet material such as synthetic rubber, synthetic rubber impregnated fabric, synthetic plastic material, leather, or the like overlies the flange 21c and the recessed face of the rotating seal ring 20. This diaphragm can have a bowed intermediate portion 22a extended into the recess 20c.

A sleeve 23 is pressed onto the shaft 21 and has an outturned flange 23a clamping the inner portion of the diaphragm against the collar 21c.

A metal cup member 24 has a skirt 24a enveloping the rotating seal ring 20, which skirt 24a can be spun inwardly on the free end thereof to fixedly mount the cup on the rotating seal ring. The cup has a wall or base portion 24b overlying the marginal portion of the diaphragm 22 to clamp this marginal portion of the diaphragm between the cup and the seal ring.

A collar or upstanding flange 24c is also provided on the cup member to form a retainer for a coil spring 25 held under compression between the base 24b of the cup and a washer or retainer 26 bottomed on the splined hub 13a of the rotor. The washer 26 is, of course, apertured to receive the splined end 21a of the shaft 21 therethrough and, in addition, can have an upstanding flange or collar 26a around the periphery thereof to center the spring 25.

In the above-described seal construction it will be noted that spring pressure is exerted on the rotating seal ring at the outer peripheral portion of the ring, which portion is radially outward from the sealing face 20a of the ring. The spring pressure, therefore, tends to always maintain the sealing face in full engagement with the sealing face 17b of the stationary seal ring 17.

The diaphragm construction is such that no leakage can occur from the sealing chamber S. C. into the recess 20c of the rotating seal ring because the diaphragm is clamped by the sleeve 23 against the flange 21c of the shaft at its inner peripheral portion and is clamped by the cup 24 and rotating seal ring 20 at its outer peripheral portion.

In the event that the drive shaft is cocked or wobbled during rotation, as shown in Figure 2, the flange or collar 21c thereof may be moved away from the bottom of the recess 20c of the rotating seal ring 20 but, in view of the sealed relationship of the diaphragm with the other face of the collar and with the sealing ring, leakage from the seal chamber S. C. cannot occur. Since the rotating seal ring is urged by the spring into full face engagement with the stationary seal ring, this rotating seal ring will not cock or tilt with the drive shaft. The exertion of the spring pressure on the rotating seal ring radially outward from both the sealing face 20a of the seal ring and the collar 21c of the drive shaft will prevent cocking of the seal ring, even though the drive shaft is cocked.

Since the diaphragm 22 is clamped, around the inner marginal portion thereof, between the shaft collar 21c and the flange 23a of the sleeve 23 which is pressed fitted onto the shaft and is clamped, around the outer peripheral portion thereof, between the seal ring 20 and the cup 24 spun onto this seal ring, the seal ring 20 is positively driven with the shaft 21.

The retainer or washer 26, of course, turns with the hub 13a of the rotor driven by the shaft 21 and the spring 25 between the retainer and cup 24 on the seal ring 20 rotates with the retainer cup and seal ring 20.

Figures 3 and 4 of the drawing illustrate the importance of maintaining the seal rings in constant engagement even though a temporary disengagement would not be disastrous to sealing conditions. In relatively rotating seal ring constructions, at least one seal ring is preferably composed of compressed graphitic carbon. In the illustrated structure the stationary seal ring 17 is a compressed carbon ring while the rotating ring 20 is metallic, preferably being composed of nitralloy. As shown in Figure 3, the rotating seal ring 20 may have beads, ridges or other projections 27 on the sealing face 20a thereof. Such projections will quickly form annular grooves 28 in the softer sealing face 17b of the stationary carbon seal ring 17. Now as long as the faces 20a and 17b are kept in constant engagement, sealing conditions will be maintained since the projections 27 will always ride in the same grooves 28 and separation of the sealing faces 20a and 17b will not occur. However, as indicated in Figure 4, if either the seal ring 17 or, as is more common, the rotating seal ring 20 becomes temporarily cocked or tilted out of full face engagement with the cooperating ring, the projections 27 will be moved out of the grooves 28 which they previously formed and will act against the flat face 17b thereby separating the face 20a from the face 17b and breaking the seal. Now, even though the projections 27 wear in new grooves in the stationary ring to permit the faces 17b and 20a to again come into full contact, repeated formation of additional grooves will soon open up leakage paths across the sealing face 17b thereby destroying the seal.

If a piece of foreign matter should work in between the faces 17b and 20a, it might form grooves in both faces. Repeated movements of the piece of foreign material out of the grooves which it forms would, of course, soon destroy the sealing faces in the same manner as illustrated in Figures 3 and 4.

In the modification shown in Figure 5, parts identical with parts described in Figures 1 and 2 have been marked with the same reference numerals. In Figure 5, however, the rotating seal ring 20 has a neck or sleeve portion 20d extending into the aperture 17a of the stationary seal ring preferably in bearing engagement with the aperture-defining wall of the stationary seal ring. This sleeve is integral with the seal ring 20 and serves to prevent any possible cocking of the seal ring so that the sealing face 20a thereof will not leave the face 17b of the stationary seal ring. The sleeve 20d acts as a pilot portion for centering the stationary seal ring.

In the modification shown in Figure 6, parts identical with parts described in Figures 1 and 2 have also been marked with the same reference numerals. In this modification, however, the spring retainer 26 is not bottomed on the splined hub 13a of the rotor, but is carried by split washers 30 seated in a groove 21d of the drive shaft 21. These split washers 30 have flanges 30a bottoming the retainer 26.

In this arrangement the reaction force of the spring 25 does not tend to force the rotor 13 against the face of the end bearing ring 14 bottomed on the casing 11 (Figure 1). With the spring retainer 26 bottomed on the shaft 21 as in Figure 6, and the pump running under pressure, the rotor 13 will operate free of end thrust.

When pump pressure varies on the splined end 21a of the drive shaft, the drive shaft will move axially in the splined hub 13a thereby changing the spring pressure on the rotating seal ring 20 in the arrangement of Figure 6. This change in pressure may be desirable since, when pump pressures are increased, the spring pressure is increased to urge the rotating seal ring against the stationary seal ring with a greater force and thereby tend to increase the seal efficiency to resist passage of fluids under higher pressure. At the same time when the pressure decreases, the spring pressure will decrease. Since the fluid will be at lower pressures the high spring pressure is not needed.

In the modification shown in Figures 1 and 2 the axial movements of the drive shaft 21 do not affect the spring pressure on the rotating seal ring since the spring is bottomed on the splined rotor hub 13a.

From the above description it will be understood that this invention provides a very efficient seal for shafts which not only rotate but move axially and transversely without in any way affecting the seal efficiency. The seals of this invention include a rotating seal ring in face engagement with a stationary seal ring, resilient means urging the rotating seal ring around the periphery thereof into sealing engagement with the stationary seal ring and a flexible diaphragm construction permitting cocking of the drive shaft as well as axial movement thereof without in any way affecting the sliding face engagement between the stationary and rotating seal rings.

It will, of course, be understood that various details of construction may be varied through a wide range without departing from the principles of this invention and it is, therefore, not the purpose to limit the patent granted hereon otherwise than necessitated by the scope of the appended claims.

We claim as our invention:

1. A shaft and seal construction comprising a stationary seal ring having a raised face portion providing an annular sealing surface, a rotating seal ring having an annular sealing face for sliding area contact with the face portion of the stationary seal ring, said rotating seal ring having a recessed face on the side thereof opposite said annular sealing face, a shaft extending freely through both of said rings and having an integral collar in the recess provided by the recessed face of the rotating seal ring, said collar being smaller than said recess to provide an annular gap between the periphery of the collar and the rotating seal ring, a non-metallic flexible diaphragm sheet having an inner portion overlying the collar, a bowed intermediate portion bridging said gap accommodating relative axial and tilting movements of the shaft and rotating seal ring and a marginal portion overlying the recessed face of the rotating seal ring, a sleeve pressed on said shaft having a flange clamping the inner portion of said diaphragm against the collar, a cup surrounding the rotating seal ring having a base portion clamping the marginal portion of the diaphragm against the seal ring, and a spring acting on the base of the cup to urge the annular sealing face of the rotating seal ring against the raised face of the stationary seal ring.

2. A seal construction comprising a pair of apertured seal members, means urging said members into sliding face to face engagement, a shaft extending freely through the apertures of said members, an integral collar on said shaft normally engaging a face of one of said members, spring means urging said one member against the other member, and a pliable diaphragm in sealing engagement with said one member and said collar and having an unobstructed bowed intermediate portion adapted to be flexed whenever the collar is moved out of engagement with said one member while preventing leakage past the collar.

3. A shaft and seal construction comprising a stationary seal member having a face portion providing an annular seating surface, a rotating seal member having an annular seating face for slid-